US008626751B2

(12) United States Patent
Scian et al.

(10) Patent No.: US 8,626,751 B2
(45) Date of Patent: Jan. 7, 2014

(54) CONTACT QUERY DATA SYSTEM AND METHOD

(75) Inventors: Anthony F. Scian, Waterloo (CA); Piotr Konrad Tysowski, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/613,138

(22) Filed: Sep. 13, 2012

(65) Prior Publication Data

US 2013/0006970 A1 Jan. 3, 2013

Related U.S. Application Data

(63) Continuation of application No. 12/125,463, filed on May 22, 2008, now Pat. No. 8,285,712, which is a continuation of application No. 10/768,318, filed on Jan. 30, 2004, now Pat. No. 7,383,250.

(51) Int. Cl.
*G06F 7/00* (2006.01)
(52) U.S. Cl.
USPC .................... 707/722; 707/917; 707/951
(58) Field of Classification Search
USPC ........................... 707/722, 917, 951
See application file for complete search history.

(56) References Cited

U.S. PATENT DOCUMENTS

| 5,923,848 | A | 7/1999 | Goodhand et al. |
| 6,823,373 | B1 | 11/2004 | Pancha et al. |
| 6,829,607 | B1 | 12/2004 | Tafoya et al. |
| 6,952,805 | B1 | 10/2005 | Tafoya et al. |
| 7,940,910 | B2 | 5/2011 | Chatterjee et al. |
| 2001/0002469 | A1 | 5/2001 | Bates et al. |
| 2002/0174188 | A1 | 11/2002 | Clark et al. |
| 2003/0232618 | A1* | 12/2003 | Le et al. .................. 455/412.2 |
| 2004/0056878 | A1* | 3/2004 | Lau et al. .................. 345/706 |
| 2004/0119758 | A1 | 6/2004 | Grossman et al. |
| 2004/0120316 | A1 | 6/2004 | McCormack et al. |
| 2005/0120084 | A1 | 6/2005 | Hu et al. |
| 2005/0131888 | A1 | 6/2005 | Tafoya et al. |
| 2006/0033706 | A1 | 2/2006 | Haitani et al. |
| 2007/0033217 | A1 | 2/2007 | Basner |

FOREIGN PATENT DOCUMENTS

WO     WO 02/15604 A2    2/2002

OTHER PUBLICATIONS

Ramakrishnan, R., Database Management Systems, WCB/McGraw-Hill, 1998, p. 13.
Office Action dated Mar. 26, 2008 for Canadian patent application No. 2456749 citing PCT Application and US Patent references.
CIPO: Office Action dated Dec. 21, 2010 for Canadian patent application No. 2,640,927 (3 pgs.).

* cited by examiner

*Primary Examiner* — Cheyne D Ly
(74) *Attorney, Agent, or Firm* — Jones Day

(57) ABSTRACT

A processor-implemented method of operating a mobile communication device operable to execute one or more communication applications includes issuing a query for contact data over a communication network, creating a contact resolution object, receiving contact data responsive to the query over the communication network, the contact data comprising communication contact data for the one or more communication applications, associating the contact data received with the contact resolution object, and resolving the contact resolution object to select communication contact data.

19 Claims, 10 Drawing Sheets

CONTACT QUERY DATA SYSTEM AND METHOD

CROSS REFERENCE TO RELATED APPLICATIONS

This is a continuation of U.S. application Ser. No. 12/125,463, filed May 22, 2008, which is a continuation of U.S. application Ser. No. 10/768,318, filed Jan. 30, 2004 (now U.S. Pat. No. 7,383,250), all the above applications hereby incorporated by reference.

BACKGROUND

1. Technical Field

This patent document generally relates to contact data queries, and in particular relates to the storing and resolution of contact data received in response to contact data queries.

2. Description of the Related Art

When a user of a communication device desires to communicate with a contact, the communication device requires the communication contact data associated with the contact, such as electronic addresses or telephone numbers. When the communication contact data for a particular contact are not stored in the communication device, the user of the communication device typically must search an external database for the communication contact data. The search may take an appreciable amount of time. Furthermore, during the search, the user of the communication device may not be able to perform communication functions until the search is completed. For example, if the communication functions include initiating a phone call, the phone program cannot allow a phone call to begin until the phone number is available. Similarly, if the communication functions include composing, addressing, and sending an e-mail, the e-mail program may not allow any functions to be performed while the search for a particular e-mail address is conducted.

Additionally, the user of the communication device may not desire to store the communication contact data received in response to the search. For example, if the user desires to keep address book entries to a minimum, or if the user knows that he or she will only communicate with the particular contact infrequently, the user may elect not to store the communication contact data in the address book on the communication device. If the user, however, needs to communicate with the contact several times over the course of the day, then the user must either execute the search each time the user invokes a communication application, or review previous message data sent to the contact in order to manually retrieve the communication contact data associated with the contact.

Finally, communication contact data received in response to a search may not be made available for multiple communication applications, or at a later time after a communication is completed. For example, if a search for contacts is conducted in an e-mail application environment, the corresponding communication contact data received may include both e-mail addresses and phone numbers. However, once the e-mail communication is sent, the communication contact data received in response to the search may be deleted, and thus is not available for later use by the e-mail program or any other communication application.

SUMMARY

A processor-implemented method of operating a mobile communication device operable to execute one or more communication applications includes issuing a query for contact data over a communication network, creating a contact resolution object, receiving contact data responsive to the query over the communication network, the contact data comprising communication contact data for the one or more communication applications, associating the contact data received with the contact resolution object, and resolving the contact resolution object to select communication contact data.

A mobile device operable to initiate and receive communications over one or more wireless communication networks comprises a processing subsystem, a memory subsystem, a display subsystem, a communication subsystem, and an input/output subsystem. Mobile device program code is stored in the memory subsystem and comprises program instructions executable by the processing subsystem. Upon execution, the program code causes the mobile device to issue a query for contact data over a communication network, create a contact resolution object, receive contact data responsive to the query over the communication network, the contact data comprising communication contact data for one or more communication applications, associate the contact data received with the contact resolution object, and resolve the contact resolution object to select communication contact data.

DETAILED DESCRIPTION

Figure 1:
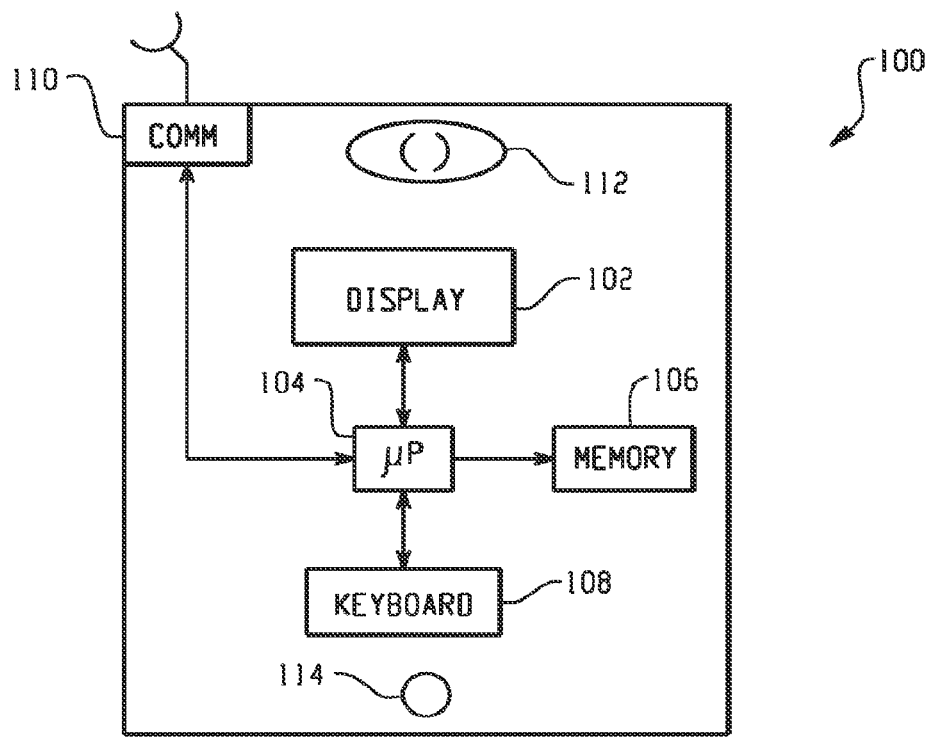
FIG. 1 is a block diagram of a mobile device.

FIG. 1 is a block diagram of a mobile device 100. The mobile device 100 may comprise a display subsystem 102, a processing subsystem 104, a memory subsystem 106, a keyboard subsystem 108, and a communication subsystem 110. The mobile device 100 may be any mobile communication device adapted to operate within a wireless communication network and is preferably a two-way communication device. An audio subsystem comprising a speaker 112 and a microphone 114 may also be included if the mobile device 100 supports voice communication functions. A more detailed description of the mobile device 100 and an exemplary operating environment for the mobile device 100 is described with respect to FIGS. 20 and 21 below.

Depending on the functionality provided by the mobile device 100, the mobile device 100 may be referred to as a data messaging device, a two-way pager, a cellular telephone with data messaging capabilities, a wireless Internet appliance or a data communication device (with or without telephony capabilities). Data communication functions, such as e-mail, instant messaging, paging, and the like, are primarily facilitated by the display subsystem 102, the keyboard subsystem 108, and the communication subsystem 110, which provide the primary user interface and communication capability for composing, reading and replying to data communications. Voice communication functions are further facilitated by the audio subsystem comprising the speaker 112 and the microphone 114.

The memory subsystem 106 stores mobile device program code comprising program instructions that are executable by the processing subsystem 104. The mobile device 100 is thus a programmable device that may be programmed to carry out multiple functions upon execution of the mobile device program code by the processing subsystem 104. The memory subsystem 106 may also store contact data comprising contact names and associated communication contact data, such as telephone numbers and e-mail addresses. The contact data may be accessible by an application program for browsing and management. An address book program is an example of one such application that may store and manage contact data in the memory subsystem 106.

Figure 2:
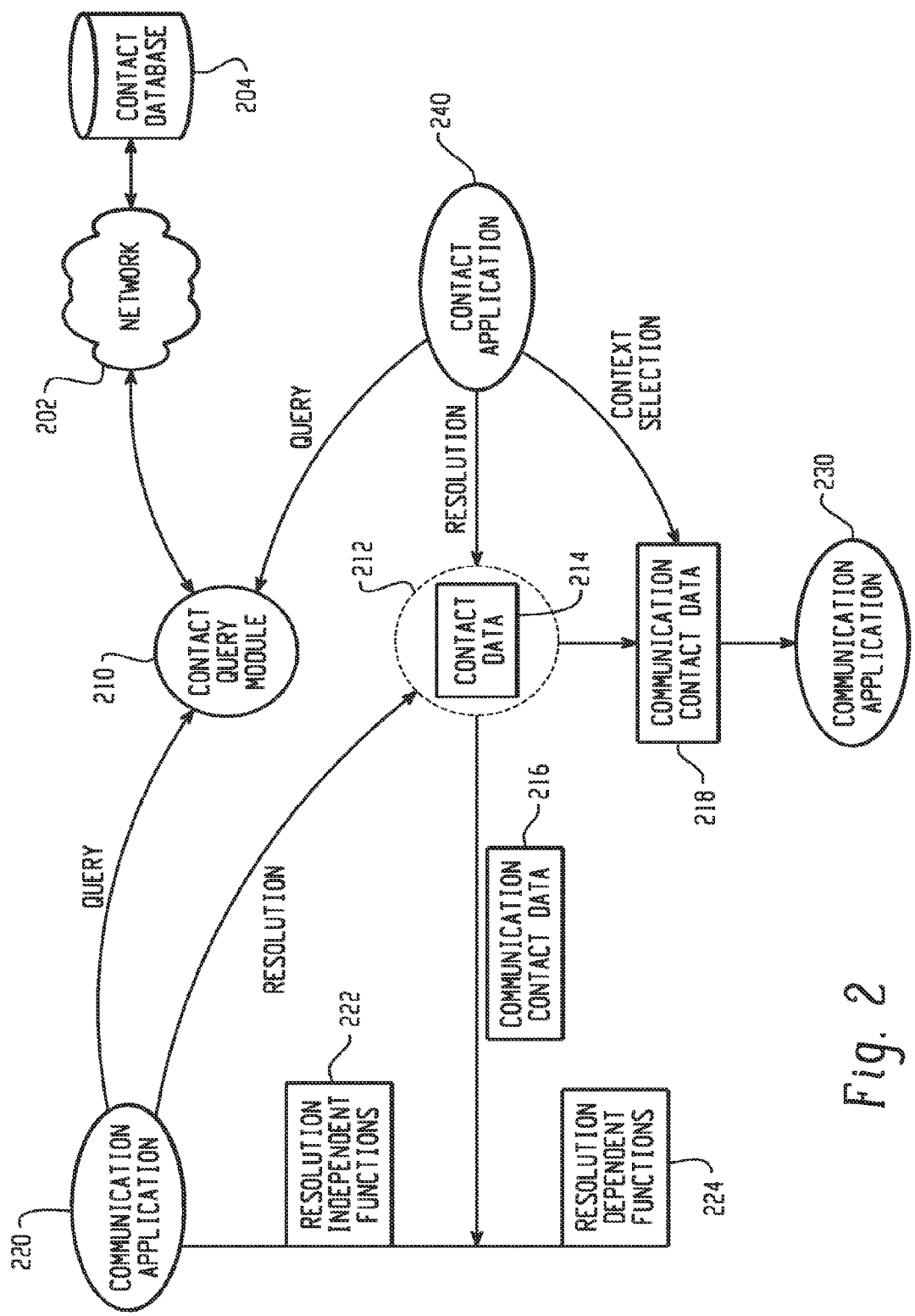
FIG. 2 is a structure block diagram of a contact query data system that may be implemented in the mobile device of FIG. 1.

FIG. 2 is a structure block diagram of a contact query data system that may be implemented in the mobile device 100 of FIG. 1. The mobile device 100 is operable to communicate over a network 202 and provides queries to and receives data from a contact database 204. The mobile device 100 may have stored in the memory subsystem 106 a contact query module 210, communication applications 220 and 230, and a contact application 240.

The contact database 204 stores a list of contacts and their associated communication contact data. The communication contact data may comprise electronic addresses, such as e-mail addresses, instant messaging addresses, and pager numbers, for example, and may further comprise other communication contact data, such as telephone numbers, cell phone numbers, and the like. Exemplary contact databases 204 may be realized by implementing one of several commercially available systems, such as a Microsoft Exchange Server or a Lotus Domino Server.

The contact query module 210 determines an appropriate query structure depending on the service that it provides and the particular type of contact database 204. For example, the contact query module 210 may conduct a search of an Outlook mail server directory using the Lightweight Directory Access Protocol (LDAP). Other mail protocols, such as Lotus Notes, may also be supported.

The communication applications 220 and 230 may be associated with different communication functions. For example, the communication application 220 may comprise an e-mail communication program, and the communication application 230 may comprise a telephone communication program. Additional communication applications may also be included in the mobile device 100.

The contact application 240 may be associated with one or more communication applications and further provides a capability for the user to store, review, and organize contact data in the mobile device 100. An address book application is an example of one such contact application 240. The contact application 240 manages contact data for one or more contacts. The contact data comprises a contact's name, address, and associated communication contact data, such as telephone numbers, fax numbers, e-mail addresses, and the like.

A contact query may be initiated from within a communication application environment, as indicated by the arrow from the communication application 220 to the contact query module 210. Alternatively, the contact query may be initiated from within a contact application environment, as indicated by the arrow from the contact application 240 to the contact query module 210. A contact query may also be initiated from any other appropriate operating environment of the mobile device 100.

A contact query is typically initiated when the user of the mobile device 100 desires to communicate with a particular contact but does not have the contact's corresponding communication contact data. For example, if the user desires to send a co-worker contact an e-mail message, and the user does not remember the co-worker contact's e-mail address and the co-worker contact's e-mail address is not stored in the user's mobile device 100, then the user may initiate a search on a company global contact database 204.

Upon receiving contact query data, the contact query module 210 creates a contact resolution object 212, and causes the mobile device 100 to transmit the query to the contact database 204 via the communication network 202. Upon receiving contact data 214 responsive to the query, the contact query module 210 associates the contact data 214 received with the contact resolution object 212. The contact resolution object 212 and the received contact data 214 are stored in the memory subsystem 106 of the mobile device 100.

The contact resolution object 212 is an object that may be resolved to one or more contacts related to the received contact data 214. When a contact resolution object 212 is resolved to a particular contact, then a communication application receives the corresponding communication contact data for that contact. For example, if a contact query comprises a search for contacts with the last name "Smith" and the received contact data 214 comprises contact data for three separate contacts with the last name "Smith"—Andy Smith, Betty Smith, and Charlie Smith—then the contact resolution object 212 may be resolved to any one of these three separate contacts. If the contact resolution object 212 is resolved to the first contact, e.g., Andy Smith, then a communication application will receive the corresponding communication contact data for Andy Smith. Thus, if the communication application is an e-mail program, the communication application will receive the e-mail address for the resolved contact Andy Smith. Similarly, if the communication application is a telephone communication program, then the communication application will receive the telephone number for Andy Smith.

The contact resolution object 212 may also function to allow communication applications to perform resolution independent functions prior to resolution of the contact resolution object 212, and perform resolution dependent functions after resolution of the contact resolution object 212. For example, when addressing an e-mail, a user of an e-mail client program may conduct a search of a global contact database

204. However, when the search is being conducted, many e-mail client programs are either unable to perform other functions or will not allow the performance of other functions until the search is completed. Thus, a user may have to wait until the search of the contact database 204 is completed before addressing the e-mail to another contact, or composing the body of the e-mail. The contact resolution object 212, however, represents an address object in the e-mail client program. Thus, the contact resolution object 212 allows a communication application 220 to perform resolution independent functions 222 prior to resolution, and allows the communication application 220 to perform resolution dependent functions after resolution.

Upon creation of the contact resolution object 212, the communication application 220 may perform resolution independent functions 222. Resolution independent functions are functions that can be performed without resolving the contact resolution object 212 to a particular contact, such as composing the body of an e-mail message, addressing the e-mail message to other recipients, and the like. After received contact data 214 has been associated with the contact resolution object 212 and the contact resolution object 212 is resolved to a particular contact so that the communication application 220 receives communication contact data 216 for the particular contact, then the communication 220 application may perform resolution dependent functions. Resolution dependent functions are functions that can be performed only after resolving the contact resolution object 212 to a particular contact, such as addressing the e-mail message to the actual e-mail address of the resolved contact, sending the e-mail message to the recipients, and the like.

Because the contact resolution object 212 and the associated contact data are stored in the mobile device 100 memory, the contact resolution object 212 may be later referenced and resolved to another contact. For example, upon creation of the contact resolution object 212, a corresponding entry in an address book associated with a contact application 240 is created. After received contact data 214 has been associated with the contact resolution object 212, the contact resolution object 212 may be repeatedly referenced and resolved to particular contacts. For example, after sending the e-mail message to Andy Smith, the user of the mobile device 100 may later reference the contact resolution object 212 and resolve the contact resolution object to Betty Smith or Charlie Smith to obtain their corresponding communication contact data 218.

Resolution of the contact resolution object 212 may be context-sensitive. The resolution is context-sensitive when the selection of particular communication contact data causes the mobile device to launch a corresponding communication application, or when the communication contact data are automatically selected depending on the corresponding communication application environment.

For example, if the user of the mobile device 100 resolves a contact resolution object 212 from within an environment of a telephone communication application, the corresponding phone number in the communication contact data 216 is provided to the telephone communication application. Similarly, if the user of the mobile device 100 resolves a contact resolution object 212 from within the environment of a e-mail communication application, the corresponding e-mail address in the communication contact data 216 will be provided to the e-mail communication application. Alternatively, if the user of the mobile device 100 resolves a contact resolution object 212 from within the environment of a contact application 240 and selects a particular address in the communication contact data 218, such as a telephone number, a corresponding communication application 230 will launch, such as a telephone communication application. Finally, if contact data for only one contact is received, then the contact resolution object 212 may be auto-resolved to the contact data for the one contact. Alternatively, the user may be prompted to confirm auto-resolution to the contact data received for the one contact.

Figure 3:
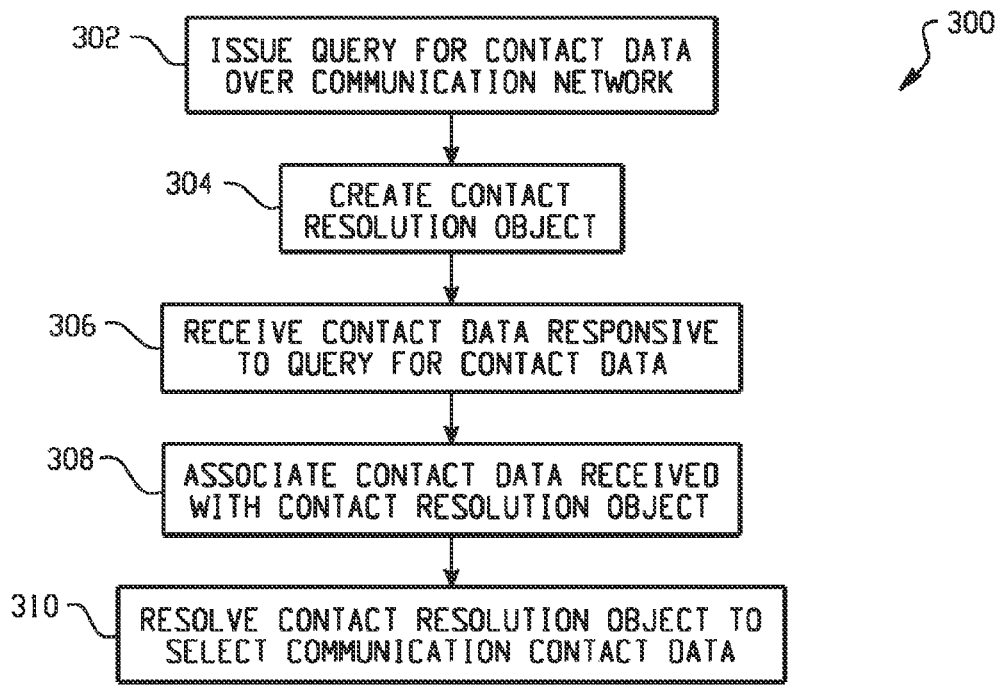
FIG. 3 is a flow diagram of a contact query process.

FIG. 3 is a flow diagram 300 of a contact query process. In step 302, a query for contact data is issued over a communication network from the mobile device 100. The query is responsive to a user input query, such as a search conducted from an address book application or from within a communication application environment.

In step 304, a contact resolution object is created. In the embodiment shown, the contact resolution object is created upon the query being issued over the communication network. In another embodiment, however, the contact resolution object may be created upon receiving contact data responsive to the query.

In step 306, contact data responsive to the query is received at the mobile device 100. The contact data typically comprises contact names and associated communication contact data, such as telephone numbers and e-mail addresses.

In step 308, the contact data received is associated with a contact resolution object. Associating the contact data received with the contact resolution object allows the contact resolution object to be resolved to one or more contacts.

In step 310, the contact resolution object is resolved to select communication contact data. The resolution may be automatic, such as the case in which contact data for only one contact is received, or may be subject to user selection, such as the case in which contact data for a plurality of contacts is received.

Figure 4:
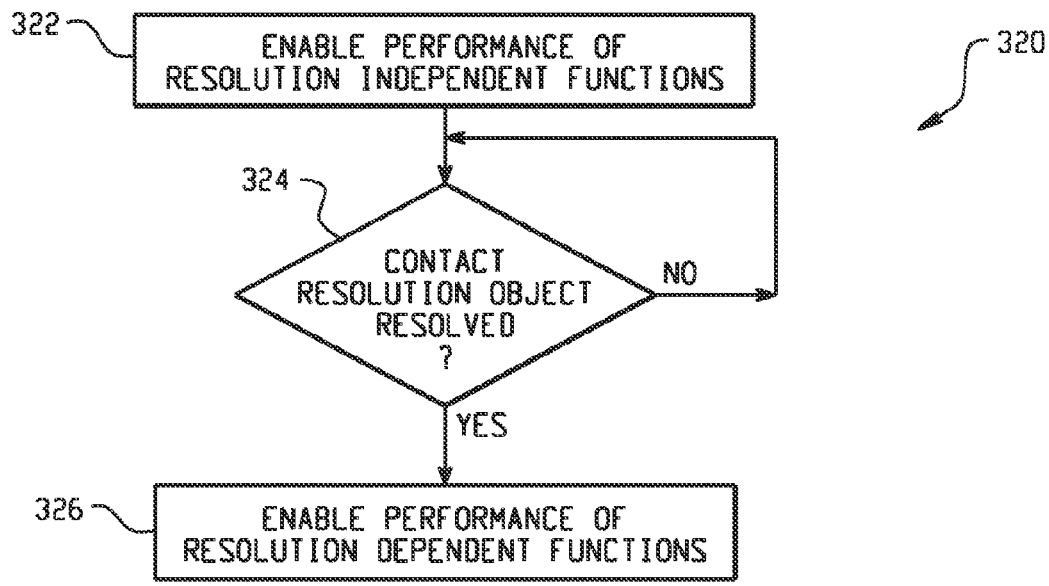
FIG. 4 is a flow diagram for enabling resolution-independent and resolution-dependent functions.

FIG. 4 is flow diagram 320 for enabling resolution-independent and resolution-dependent functions. Steps 322, 324, and 326 occur after the creation of a contact resolution object. In step 322, performance of resolution independent functions is enabled. Resolution independent functions are functions that do not require resolution of the contact resolution object, e.g., addressing a communication to another contact, composing a body of the message of a communication, and the like.

Step 324 monitors whether the contact resolution object has been resolved. If the contact resolution object has not been resolved, then step 324 continues to monitor whether the contact resolution object has been resolved. If the contact resolution object has been resolved, then performance of resolution dependent functions is enabled in step 326. Resolution dependent functions are functions that require resolution of the contact resolution object, e.g., addressing a communication to a contact listed in the contact data associated with the contact resolution object, sending an e-mail communication to the contact, initiating a telephone communication to the contact, and the like.

Figure 5:
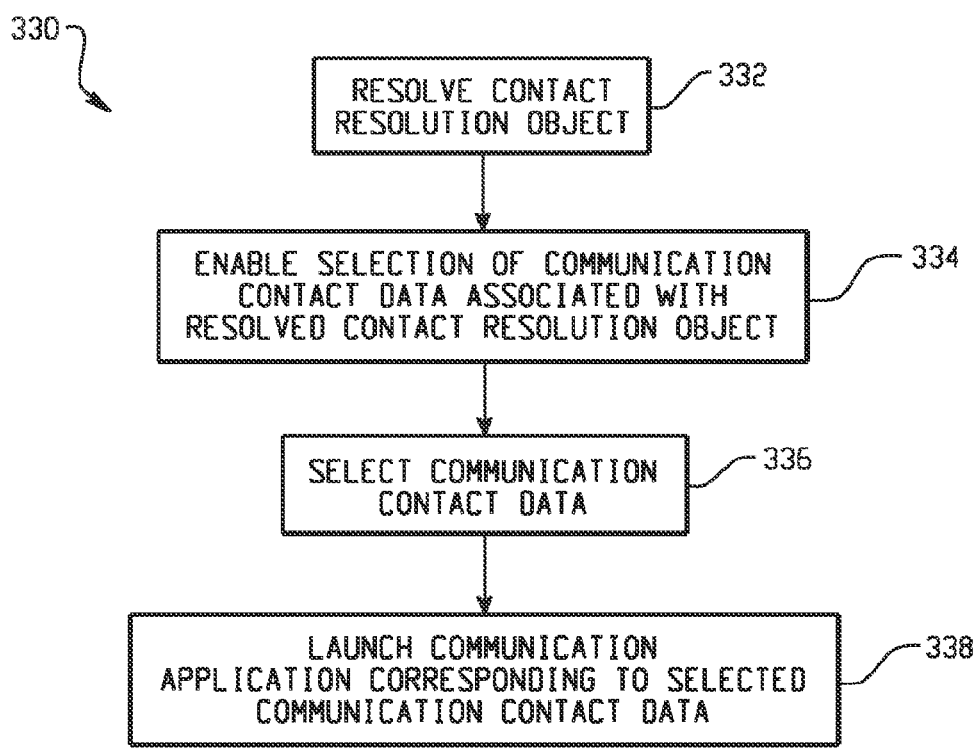
FIG. 5 is a flow diagram for a first context-sensitive selection of communication contact data.

FIG. 5 is a flow diagram 330 for a first context-sensitive selection of communication contact data. In step 332, the contact resolution object is resolved to a contact. In step 334, selection of communication contact data associated with the resolved contact resolution object is enabled. Step 334 may be implemented, for example, by displaying the communication contact data associated with the contact, such as the contact's telephone numbers, e-mail addresses, and other communication contact data.

In step 336, communication contact data are selected. The communication contact data may be selected by the user, such as the manual selection of an e-mail address, or may be automatically selected depending on selection rules defined by the user.

In step 338, a communication application corresponding to the selected communication contact data is launched. For example, if the selected communication contact data is a telephone number, then a telephone communication application is launched. Similarly, if the selection communication contact data selected is an e-mail address, then an e-mail communication application is launched.

Figure 6:
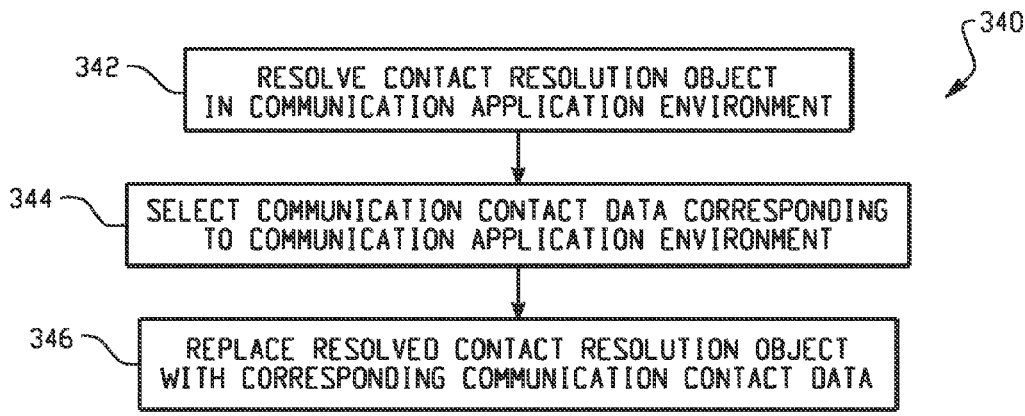
FIG. 6 is a flow diagram for a second context-sensitive selection of communication contact data.

FIG. 6 is a flow diagram 340 for a second context-sensitive selection of communication contact data. The second context-sensitive selection of communication contact data is dependent upon the communication application environment from which the contact resolution object is resolved.

In step 342, the contact resolution object is resolved in a communication application environment. A contact resolution object may be resolved in a communication application environment by selecting the contact resolution object and resolving it to a particular contact. For example, if the communication application is an e-mail communication application, then the contact resolution object may be listed in the address line of the e-mail message. Selecting the contact resolution object may invoke the displaying of a list of associated contacts, and selection of one or more of the contacts will resolve the contact resolution object. Thus, if a contact resolution object is associated with five contacts and their corresponding communication contact data, then selection of one or more of the contacts will resolve the contact resolution object to the one or more selected contacts.

In step 344, communication contact data corresponding to the communication application environment is selected. For example, if the communication application is an e-mail communication application, then the e-mail address of the contact to which the contact resolution object has been resolved is selected. If the contact resolution object has been resolved to more than one contact, then the e-mail addresses of the contacts to which the contact resolution object has been resolved are selected. In step 346, the resolved contact resolution object is replaced by the communication contact data selected in step 344.

Figure 7:
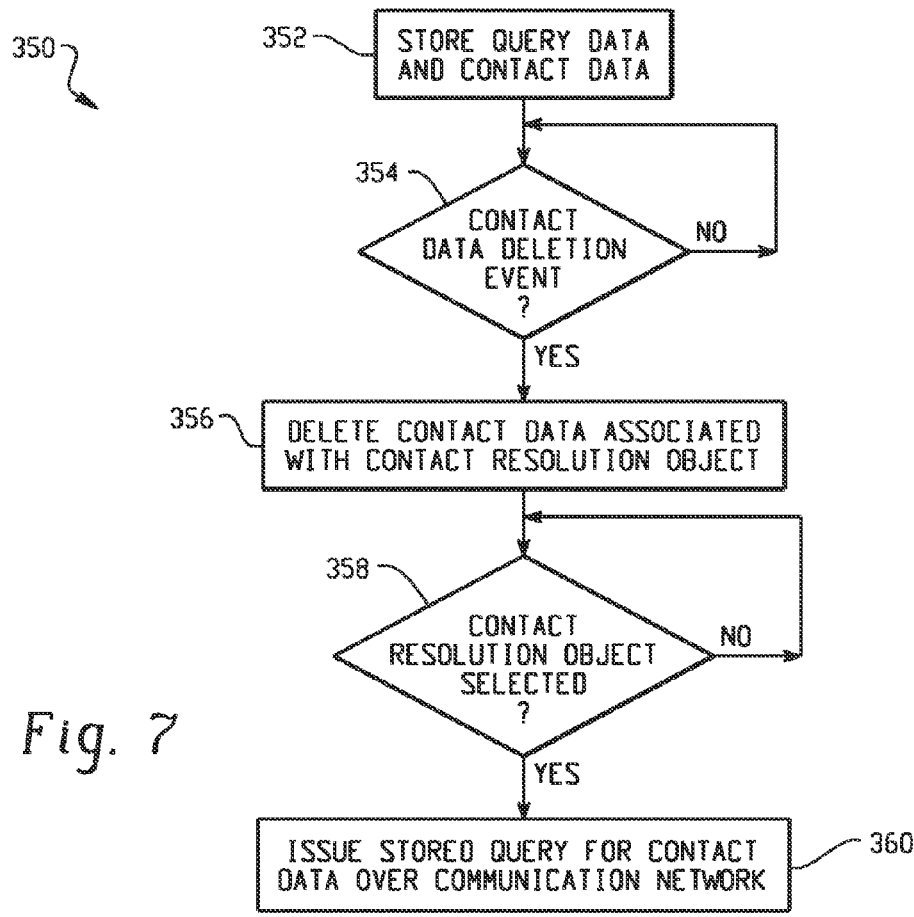
FIG. 7 is a flow diagram for storing and executing contact queries.

FIG. 7 is a flow diagram 350 for storing and executing contact queries. Often a user of the mobile device 100 may not desire to store the communication contact data received in response to each search. For example, if the user desires to keep address book entries to a minimum, or if the user knows that he or she will only communicate with the particular contacts that are responsive to the search infrequently, the user may elect not to store the communication contact data in the address book on the mobile device 100. Thus, the search query and associated contact data are temporarily stored on the mobile device 100. If the user needs to communicate with the contacts several times over the course of the day, then the user need only reference the contact resolution object to obtain the communication contact data.

Communication contact data received in response to each search may also be deleted to minimize memory requirements. For example, in one embodiment, the number of contact resolution objects comprising query data and communication contact data received is limited to a fixed number, e.g., five, and prioritized on a first-in, first-out basis. Thus, if five contact resolution objects are stored, and a sixth contact resolution object is created, then the first-in of the five stored contact resolution objects is deleted so that the sixth contact resolution object may be stored. To further minimize memory requirements, the contact data may be deleted after the occurrence of an event, e.g., a timeout period, and the query data retained and associated with the contact resolution object. Accordingly, if the user needs to communicate with a contact whose contact data has been deleted, the user need only access the contact resolution object rather than reenter the query data to again execute the query.

In step 352, the query data and contact data associated with a contact resolution object are stored in the mobile device 100 memory subsystem 106. The query data may comprise a simple search string, such as "Smith" for a search for contacts with the name "Smith." The query data may also comprise wildcards and Boolean expressions, such as root expanders, AND operators, OR operators, and the like.

Step 354 monitors whether a contact data deletion event has occurred. A contact data deletion event is an event that will cause the contact data associated with a contact resolution object to be deleted from the mobile device 100 memory subsystem 106. The event may be a timeout period from the last access of the contact resolution object, a set time period, a low memory condition, or some other event that may be monitored for occurrence.

If the contact data deletion event has not occurred, then step 354 continues to monitor whether the contact data deletion event has occurred. If the contact data deletion event has occurred, then in step 356 the contact data associated with the contact resolution object are deleted.

Step 358 then monitors whether the contact resolution object is selected. If the contact resolution object has not been selected, then step 358 continues to monitor whether the contact resolution object is selected. The monitoring step 358 may continue until the contact resolution object is selected, or until a deletion event occurs which causes the contact resolution object to be deleted from the mobile device 100 memory subsystem 106.

If the contact resolution object has been selected, then step 360 issues the stored query for contact data over the communication network. Thus, the user need not recreate or manually reenter the query. Upon receiving contact data responsive to the query, the contact data are again associated with the contact resolution object and steps 352-360 are repeated.

Query data may be deleted in much the same manner as the contact data is deleted in FIG. 7. For example, after the contact data associated with the query data is deleted, then the mobile device may monitor for the occurrence of a deletion event associated with the query data, such as the expiration of a time-out period or the occurrence of a low memory condition. This prevents the accumulation of unused query data. In another embodiment, both the query data and the contact data are deleted after the occurrence of a deletion event, such as the expiration of a time-out period or the occurrence of a low memory condition. In another embodiment, the contact resolution object is deleted upon the occurrence of storage of the communication contact data in a contact management store, such as an address book application.

Conditions may also occur that prevent deletion of a contact resolution object. For example, if a contact resolution object is resolved to a telephone number, and the user of the mobile device then engages in telephone call to the telephone number of a duration longer than a time-out period that would require deletion of the contact resolution object, the selection of the contact resolution object by the telephone application may prevent such deletion. Likewise, if a contact resolution object is selected by an e-mail application, and the user of the mobile device composes and then saves the e-mail for sending at a later time, the contact resolution object selected by the e-mail program will be stored at least until the e-mail application sends the e-mail communication. Thus, selection or referencing of a contact resolution object (whether resolved or not resolved) by a communication application can preclude deletion of the contact resolution object until a communication is completed.

Figure 8:
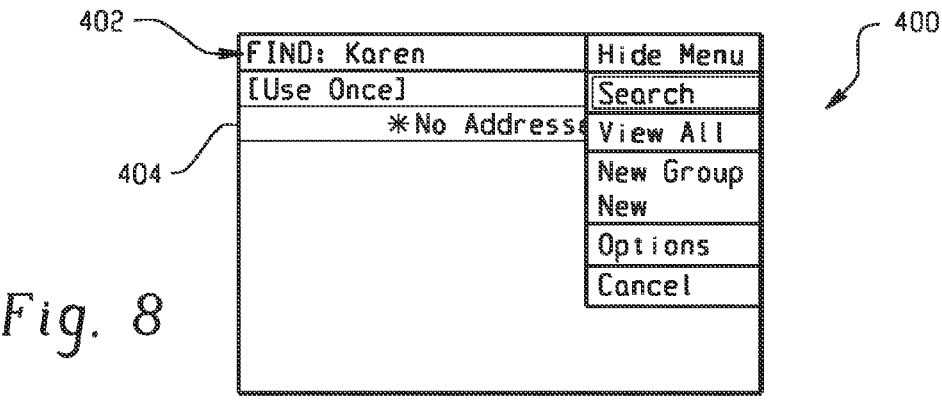
FIG. 8 is an illustration of a first address book display environment.

FIGS. 8-19 describe exemplary display environments for embodiments of the apparatus and methods described with respect to FIGS. 1-7 above. In particular, FIG. 8 is an illustration of a first address book display environment 400 on the mobile device 100. As shown, the user of the mobile device 100 has searched the address book on the mobile device 100 for a contact named "Karen," as indicated by search string 402. A search result 404 indicates that no results were found in response to the search of the locally stored contacts.

Figure 9:
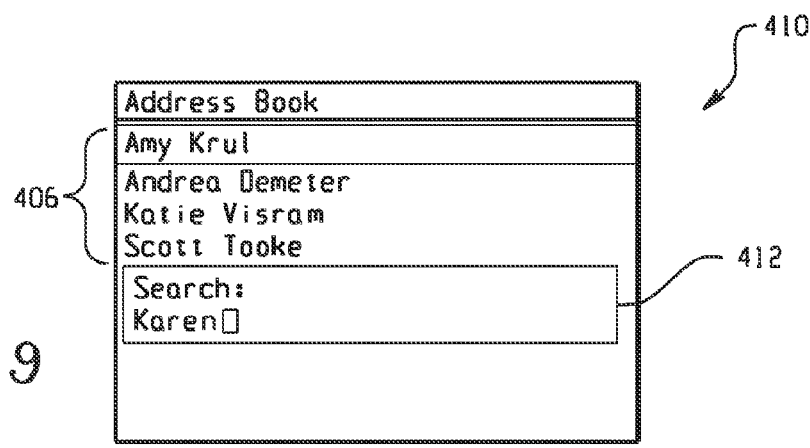
FIG. 9 is an illustration of a second address book display environment and a search dialog box.

FIG. 9 is an illustration of a second address book display environment 410 and a search dialog box 412. The search dialog box 412 corresponds to searches that are conducted on external contact databases, such as the contact database 204 of FIG. 2. The user enters a search string 414 for the contact named "Karen."

Figure 10:
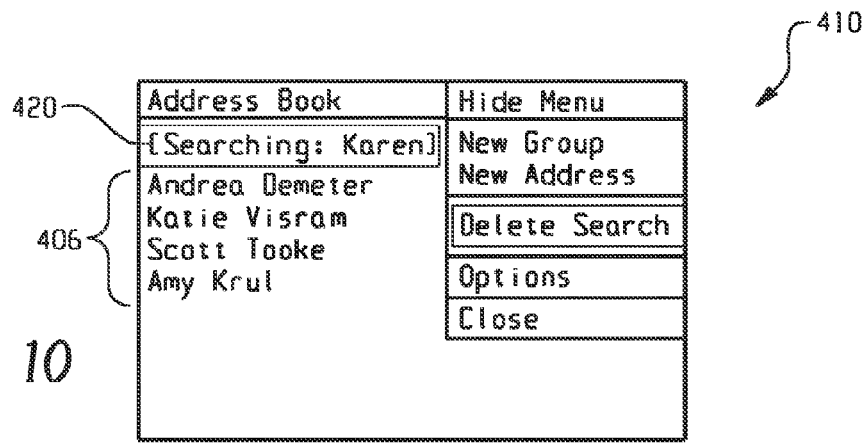
FIGS. 10 and 11 are illustrations of the second address book display environment and a contact resolution object.
Figure 11:
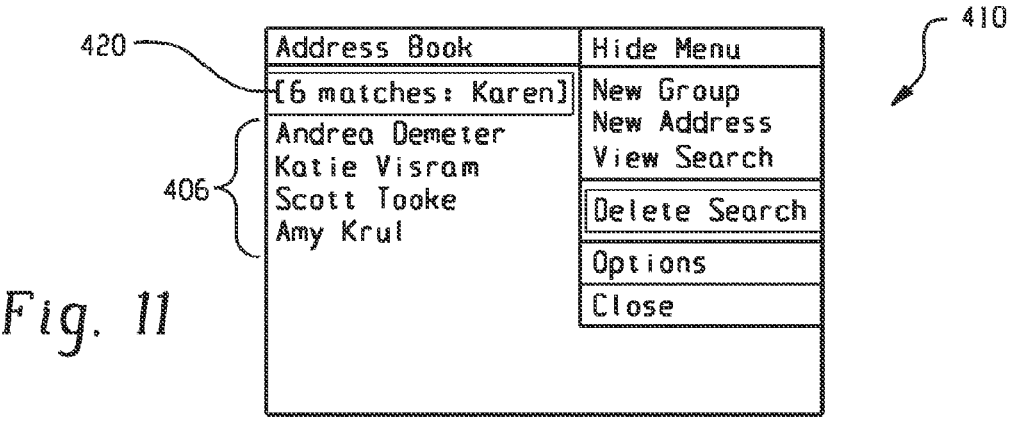

FIGS. 10 and 11 are illustrations of the second address book display environment 410 and the contact resolution object 420. Upon issuing the search query to the external contact database, the contact resolution object 420 is created and displayed as an entry in the address book. As shown in FIG. 10, the contact resolution object 420 comprises a bracketed string "[Searching: Karen]."

The text of the string indicates that the complete results of the search have not yet been received from the external contact database. Thus, in this embodiment, the contact resolution object includes status indicia indicating the status of the search. In one embodiment, the contact resolution object cannot be resolved until the entire search is completed. In another embodiment, the contact resolution object may be resolved as soon as contact data are received for one or more contacts responsive to the query for contact data.

As shown in FIG. 11, the contact resolution object 420 comprises a bracketed string "[6 matches: Karen]," thus indicating that the search on the external contact database is complete and contact data for six contacts responsive to the query have been received. The user may now select and resolve the contact resolution object in the manner described with respect to FIGS. 1-7 above.

Figure 12:
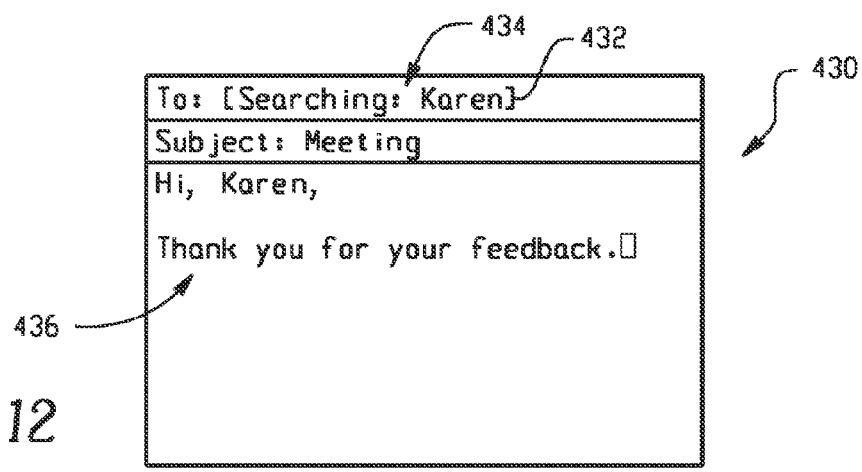
FIG. 12 is an illustration of a first communication application environment and a contact resolution object.

FIG. 12 is an illustration of a first communication application environment 430 and a contact resolution object 432. In FIG. 11, the user has addressed an e-mail message to a contact named Karen. However, because there is no contact information corresponding to a contact named Karen stored on the mobile device 100, the user has initiated a query for contact data from within the e-mail communication application environment 430. The contact resolution object 432 includes the text string 434 "Searching: Karen" indicating that the complete results of the search have not yet been received from the external contact database. The user, however, may still perform resolution independent functions within the communication application environment, such as typing an e-mail message in an e-mail editor window 436.

Figure 13:
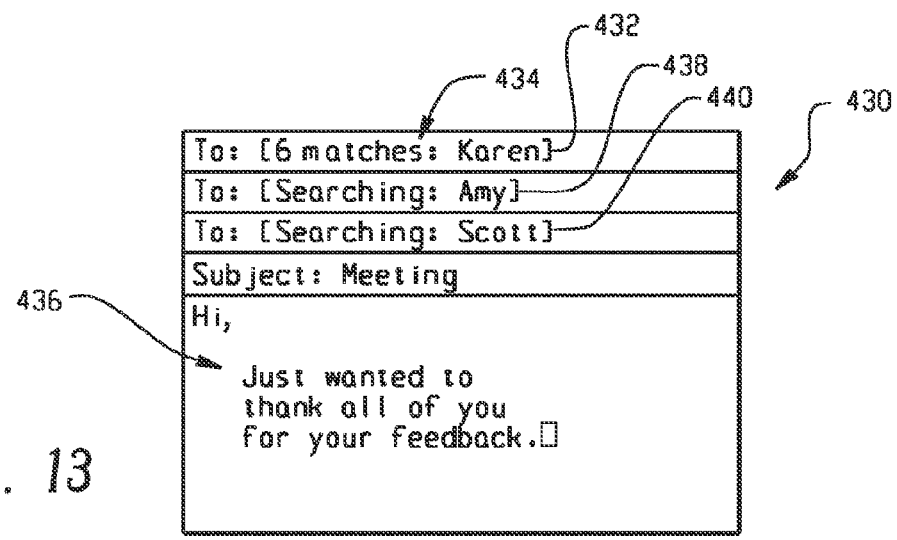
FIGS. 13 and 14 are illustrations of the first communication application environment and a plurality of contact resolution objects.
Figure 14:
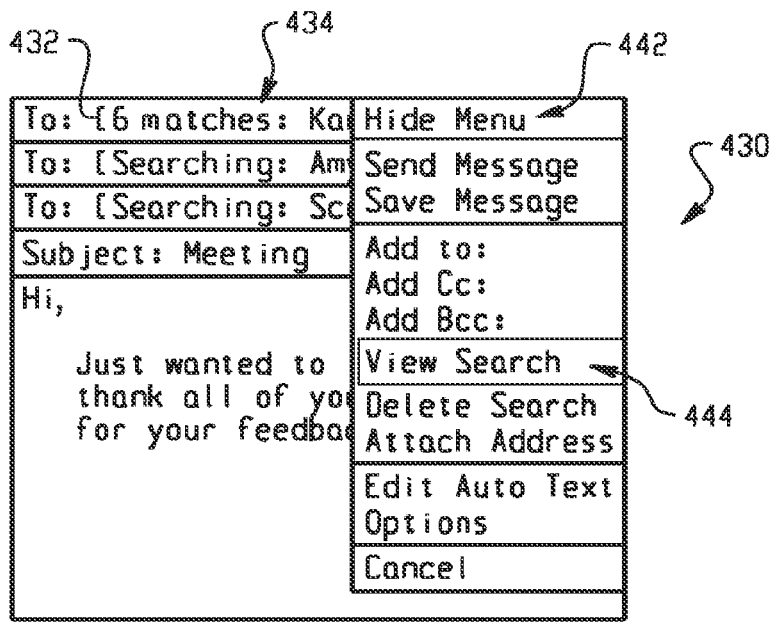

FIGS. 13 and 14 are illustrations of the first communication application environment 430 and a plurality of contact resolution objects 432, 438, and 440. FIG. 13 illustrates that more than one query for contact data may be conducted simultaneously. For example, contact resolution objects 438 and 440 are associated with queries for contact data related to contacts named Amy and Scott, respectively. Furthermore, a query for contact data may be issued to an external contact database even if there are contact data stored on the mobile device that are responsive to the query. As shown in FIG. 13, the external contact database has been queried for contact data responsive to contacts having the name Amy and for contact data responsive to contacts having the name Scott, even though such responsive contact data are stored in the locally stored contacts 406. The external contact database may be queried for such responsive contact data when the user of the mobile device is aware the locally stored contact information is dated, or if searching for another contact having the same name as one of the locally stored contacts.

A contact resolution object may be resolved by selecting the contact resolution object and viewing its associated contact data. As shown in FIG. 14, the contact resolution object 432 has been selected. A drop down menu 442 has been activated to select a "View Search" menu option 444.

Figure 15:
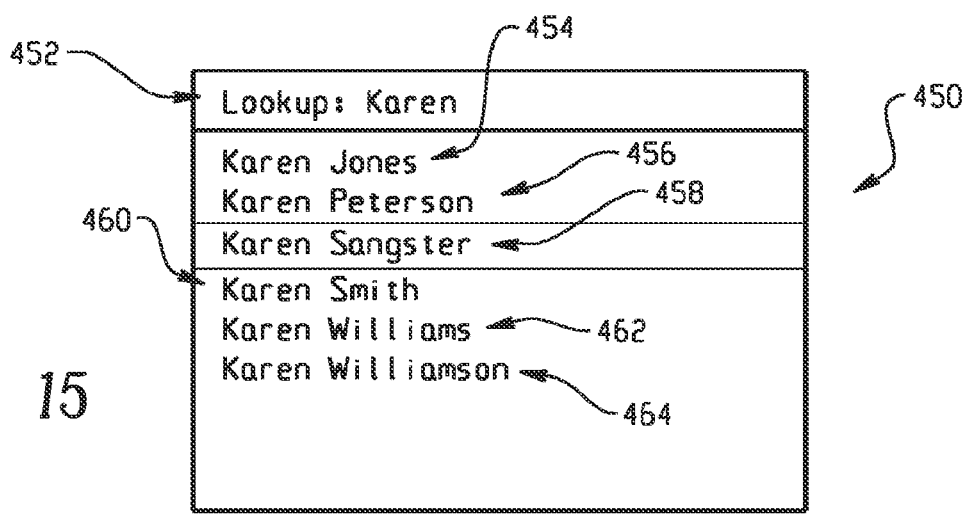
FIG. 15 is an illustration of a first contact query results display environment.

FIG. 15 is an illustration of a first contact query results display environment 450. The first contact query results display environment 450 is displayed in response to the selection of the "View Search" menu option 444 of FIG. 14. The six matches for responsive contact data include contact data for contacts Karen Jones 454, Karen Peterson 456, Karen Sangster 458, Karen Smith 460, Karen William 462, and Karen Williamson 464. The contact Karen Sangster 458 has been selected, indicating that the user desires to address the e-mail communication to this contact. While only one contact has been selected, several contacts could also be selected.

Figure 16:
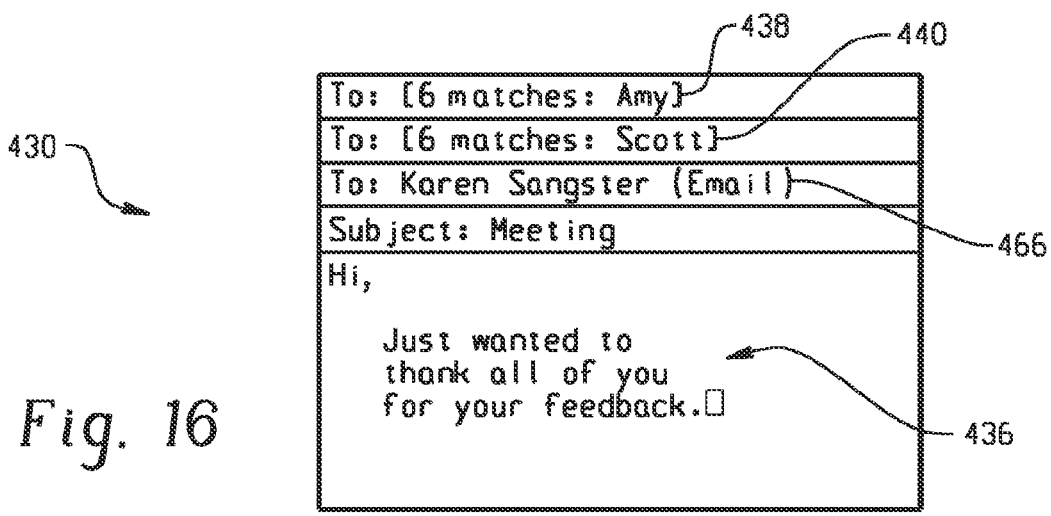
FIG. 16 is an illustration of the first communication application environment and a resolved contact resolution object.

FIG. 16 is an illustration of the first communication application environment 430 and a resolved contact resolution object 466. In this embodiment, the resolved contact resolution object 466 comprises the e-mail address of the contact selected in FIG. 15, Karen Sangster. By resolving the contact resolution object 432 to Karen Sangster in a communication application environment, the e-mail communication contact data for this contact is automatically selected and provided to the e-mail communication application. While the contact resolution object 432 of FIGS. 13 and 14 was resolved to only one contact, had several contacts been selected, the contact resolution object would have been resolved to several e-mail addresses.

In another embodiment, the contact resolution object 432 may be retained in the address field after resolution so that the user may again refer to the contact resolution object 432 and resolve it to another contact. For example, should the user resolve the contact resolution object 432 to an incorrect contact, the user may delete the resolved contact resolution object 466, and again resolve the contact resolution object 432 to the correct contact. Likewise, should the user decide to address the message to an additional contact associated with the contact resolution object 432, the user may resolve the contact resolution object 432 to the additional contact.

In another embodiment, the contact resolution object 432 is retained and displays resolution indicia indicating that the contact resolution object 432 has been resolved to a particular contact. For example, should the user resolve the contact resolution object 432 to the contact Karen Sangster, the contact resolution object 432 text will change from "[6 matches: Karen]" to "[Karen Sangster]", indicating that the object 432 has been resolved to the contact Karen Sangster. The contact resolution object 432 may be resolved to a different associated contact, however, should the user decide to address the message to the different contact.

In another embodiment, communication contact data associated with a contact to which a contact resolution object is resolved is stored. For example, if several queries are conducted by the user, and the resulting several contact resolution objects are resolved to a plurality of contacts, the plurality of contacts and associated communication contact data may be stored separately from the contact resolution objects. The plurality of contacts and associated communication contact data may be stored in a memory store separate from the memory store storing contact resolution objects, such as a separate directory for resolved contacts, for convenient access, or even retention after deletion of the contact resolution objects.

Figure 17:
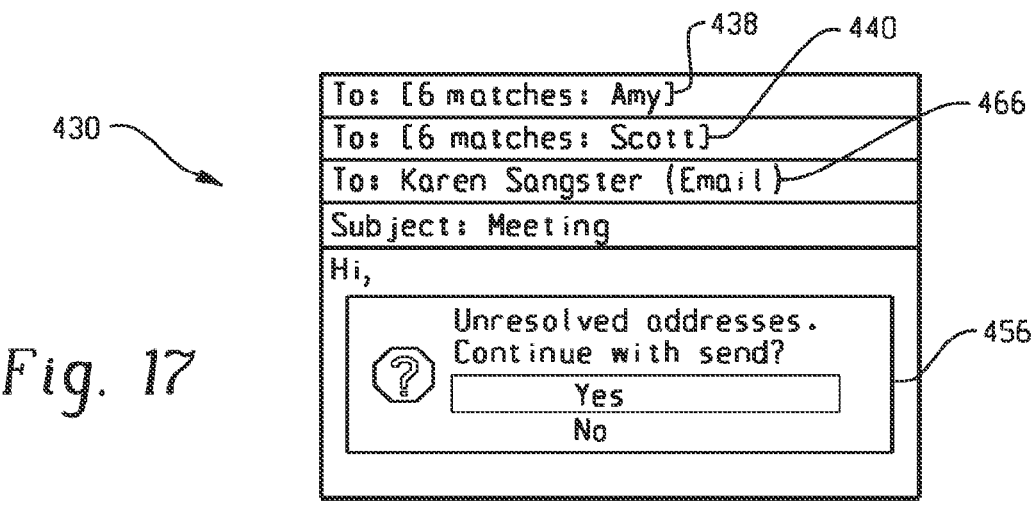
FIG. 17 is an illustration of the first communication application environment and an unresolved dialog box.

FIG. 17 is an illustration of the first communication application environment 430 and an unresolved dialog box 456. The unresolved dialog box 456 is displayed when the user of the mobile device 100 attempts to initiate or send a communication with an unresolved contact resolution object. As illustrated, the contact resolution objects 438 and 440 are unresolved. In the embodiment shown, if the user elects to send the e-mail communication without resolving the contact resolution objects 438 and 440, then the contact resolution objects 438 and 440 are discarded. If the user elects to not send the e-mail, the user may then select the contact resolution objects 438 and 440 for resolution.

Figure 18:
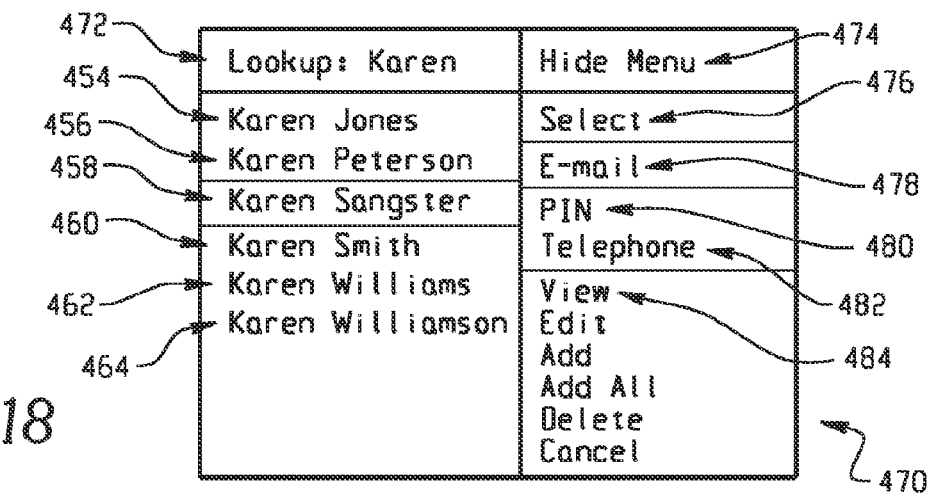
FIG. 18 is an illustration of a second contact query results display environment.

FIG. 18 is an illustration of a second contact query results display environment 470. The second contact query results display environment 470 may be invoked from an address book application environment, such as by selecting the contact resolution object 420 listed as an address book entry in FIG. 11. In the embodiment shown, the string 472 "Lookup: Karen" indicates that the contact resolution object 420 has associated contact data for the contacts 454, 456, 458, 460, and 462. A drop-down menu 474 includes a select menu option 476, an e-mail menu option 478, a PIN menu option 480, a telephone menu option 482 and a view menu option 484.

Selection of the select menu option 476 will resolve the contact resolution object to the selected contact 458, Karen Sangster. Selection of either the e-mail menu option 478, PIN menu option 480, or the telephone menu option 482 will invoke a corresponding communication application associated with the e-mail, PIN or telephone communication contact data for the selected contact 458. Additional menu options for additional communication contact data may also be displayed. For example, if the contact 460, Karen Smith, has a pager number included in her corresponding communication contact data, then a "Page" menu option may be displayed upon selection of the contact 460.

In another embodiment, the communication contact data associated with each contact may be viewed and edited before using and/or saving in a memory store. Selection of the view menu option 484 will display the contact data for the selected contact 458, Karen Sangster. Thus, upon selecting a particular menu option, the corresponding communication contact data may be displayed for editing and saving. The edited communication contact data may be stored in an address book, or may be stored in the temporary storage area used to store the communication contact data associated with the contact resolution object.

Figure 19:
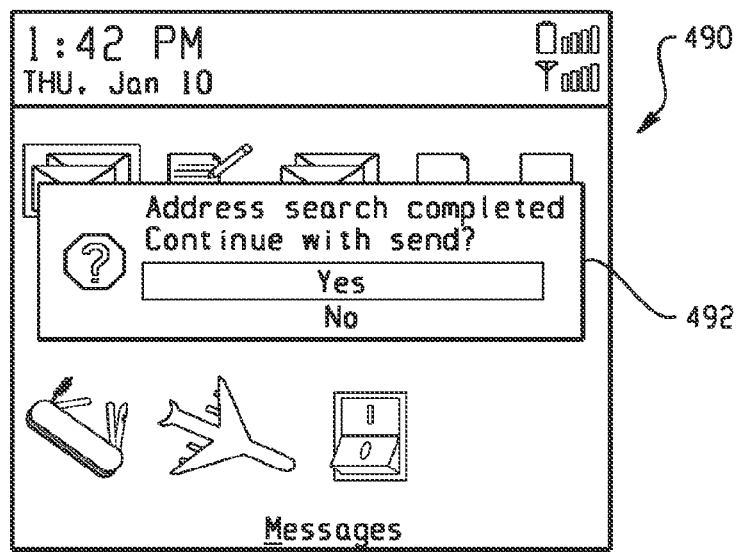
FIG. 19 is an illustration of a device display environment and a query notification dialog box.

FIG. 19 is an illustration of device display environment 490 and a query notification dialog box 492. If a query for contact data takes an appreciable amount of time, the user of the mobile device 100 may exit the communication application environment until the contact data responsive to the query is received, at which time the user may then resolve the contact resolution object. For example, if the user has composed an e-mail but contact data responsive to the contact query has not been received, the user may save the message with the referenced contact resolution object and exit the e-mail application. Upon contact data being received and associated with the contact resolution object, the mobile device 100 may notify the user that the contact resolution object may be resolved. Accordingly, the user may then provide an affirmative answer to the query notification 492 to open the e-mail message, resolve the contact resolution object, and send the e-mail message.

In addition to receiving contact data responsive to contact query, the mobile device may receive other data responsive to the contact query. For example, if the remote contact database 204 of FIG. 2 does not include any entries responsive to the contact query, a "No Results Found" message may be generated. Additionally, if the mobile device is out of coverage, or if the contact data received is corrupted, appropriate error messages may also be generated. Appropriate error processing or decision options may be implemented to handle such events.

Figure 20:
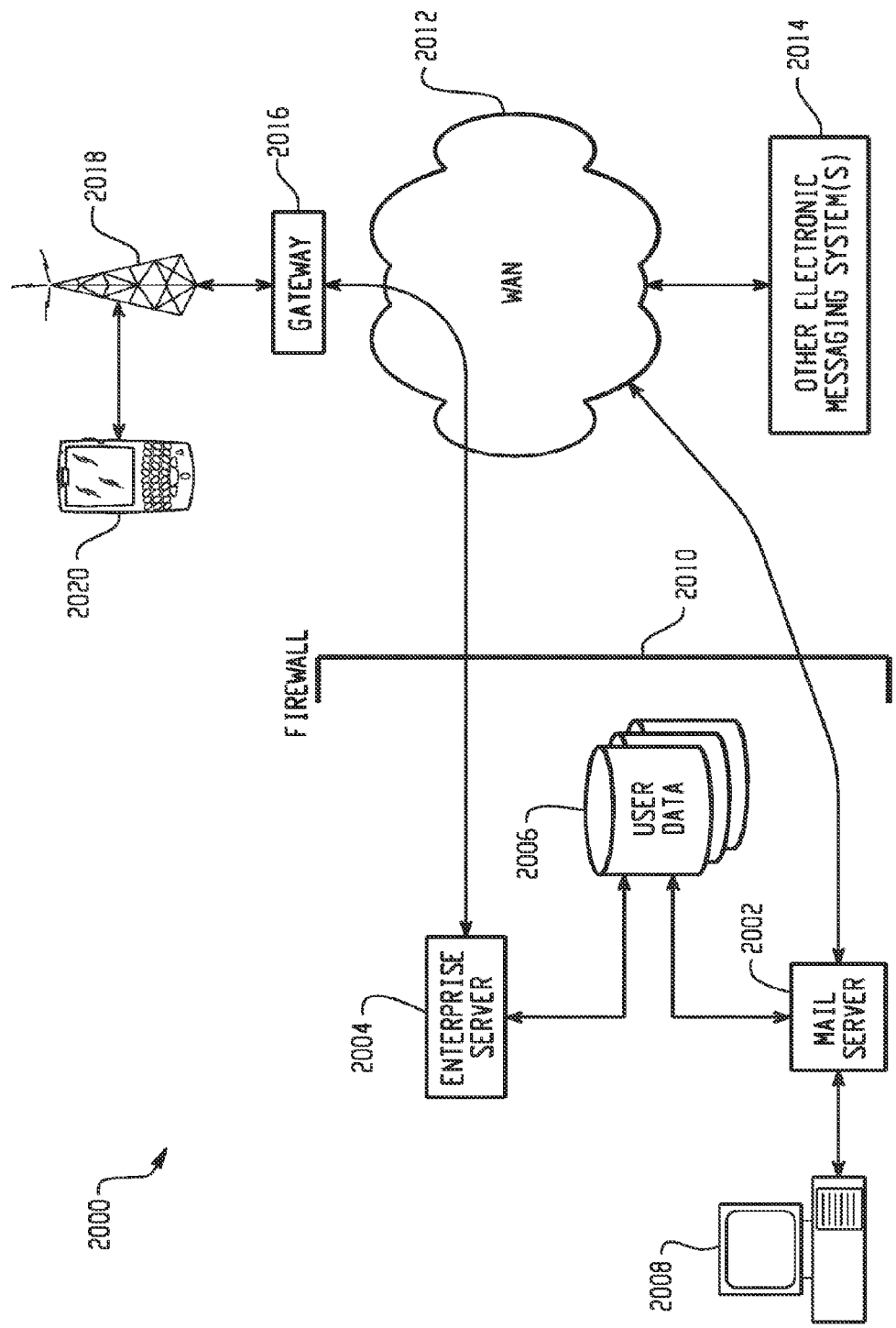
FIG. 20 is a block diagram of an example system for redirecting electronic messages to and from the mobile device of FIG. 1.

FIG. 20 is a block diagram of an example redirector system 2000 for redirecting electronic messages to and from a mobile communication device 2020. The mobile device of FIG. 1 may be used in the example system 2000 of FIG. 20. The example redirection system 2000 includes an enterprise server 2004, a mail server 2002, a storage medium 2006 for electronic messaging (e.g., e-mail) account data, and a wireless gateway 2016. Also illustrated are the mobile communication device 2020, a wireless network 2018, a wide area network (WAN) 2012, a firewall 2010, a desktop client 2008, and one or more other electronic messaging systems 2014.

The mail server 2002 may include electronic messaging software executing on a computer within a local area computer network (LAN). The mail server 2002 is coupled to local network devices 2004, 2006, 2008 via the LAN, and is coupled to remote network devices 2014, 2016 via the WAN 2012. The LAN and WAN 2012 may be separated by a firewall 2010.

The mail server 2002 maintains an electronic message account within the electronic message account database 2006 for each desktop client 2008 in the LAN. The electronic message account database 2006 may be one or more storage devices coupled to the mail server 2002, and may be included within the same network device as the mail server 2002 or in one or more separate devices within the LAN. The desktop client 2008 may be one of a plurality of computers (e.g., personal computers, terminals, laptop computers, or other processing devices) coupled to the mail server 2002 via the LAN that execute electronic messaging software to send and receive electronic messages via the mail server.

Electronic messages sent from the desktop client 2008 are stored by the mail server 2002 in an outgoing message storage location (an "outbox") within a corresponding electronic message account 2006. If the outgoing message is addressed to an electronic message account within the LAN, then the mail server 2002 delivers the message to an incoming message storage location (an "inbox") in the appropriate electronic message account 2006. If the outgoing message is addressed to an electronic message account in another electronic messaging system 2014, however, then the message is delivered via the WAN 2012. Similarly, incoming electronic messages addressed to the electronic message account 2006 is received by the mail server 2002 and stored to the electronic message account database 2006 within the appropriate incoming message storage location ("inbox"). The incoming electronic message may then be retrieved from the electronic message account 2006 by the desktop client 2008, or may be automatically pushed to the desktop client 2008 by the mail server 2002.

The enterprise server 2004 may include electronic message redirection software executing on a computer within the LAN. The enterprise server 2004 is operational to redirect electronic messages from the electronic message account 2006 to the mobile communication device 2020 and to place messages sent from the mobile communication device 2020 into the electronic message account 2006 for delivery by the mail server 2002. The enterprise server 2004 stores mobile device information, such as a wireless identification (e.g., a PIN), used to communicate with the mobile communication device 2020. The enterprise server 2004 may, for example, communicate with the mobile communication device 2020 using a direct TCP/IP level connection with the wireless gateway 2016, which provides an interface between the WAN 2012 and the wireless network 2018.

When an electronic message is received in the inbox of the electronic message account 2006, the electronic message is detected by the enterprise server 2004, and a copy of the message and any necessary mobile device information are sent over the WAN 2012 to the wireless gateway 2016. For example, the enterprise server 2004 may encapsulate a copy of the message into one or more data packets along with a wireless identification (e.g., a PIN) for the mobile communication device 2020, and transmit the data packet(s) to the wireless gateway 2016 over a direct TCP/IP level connection. The wireless gateway 2016 may then use the wireless identification and/or other mobile device information to transmit the data packet(s) containing the electronic message over the wireless network 2018 to the mobile communication device 2020.

Electronic messages sent from the mobile communication device 2020 may be encapsulated into one or more data packets along with a network identification for the enterprise server 2004 and then transmitted over the wireless network 2018 to the wireless gateway 2016. The wireless gateway 2016 may use the network identification for the enterprise server 2004 to forward the data packet(s) over the WAN 2012 to the enterprise server 2004, preferably via a direct TCP/IP level connection. Upon receiving the data packet(s) from the wireless gateway 2016, the enterprise server 2004 places the enclosed electronic message into the outbox of the associated electronic message account 2006. The mail server 2002 then detects the electronic message in the outbox and delivers the message, as described above.

Security may be maintained outside of the firewall 2010 by encrypting all electronic messages sent between the enterprise server 2004 and the mobile communication device 2020. For instance, an electronic message to be redirected to the mobile communication device 2020 may be encrypted and compressed by the enterprise server 2004, and the encrypted message may then be encapsulated into one or more data packets for delivery to the mobile communication device 2020. To maintain security, the electronic message may remain encrypted over the entire communication path 2016, 2018, 2012 from the enterprise server 2004 to the mobile communication device 2020. Similarly, electronic messages sent from the mobile communication device 2020 may be encrypted and compressed by the mobile communication device 2020 before being packetized and transmitted to the enterprise server 2004, and may remain encrypted over the entire communication path 2016, 2018, 2012 from the mobile communication device 2020 to the enterprise server 2004.

In addition, the enterprise server 2004 may include a communication subsystem, a memory subsystem and a processing subsystem. The communication subsystem may be operable to communicate with the wireless gateway 2016 over the WAN 2012. The memory subsystem may be operable to store data and program information. The processing subsystem may be operable to store and retrieve data in the memory subsystem and execute programs stored in the memory subsystem, and to cause the communication subsystem to transmit and receive information over the WAN 2012.

Figure 21:
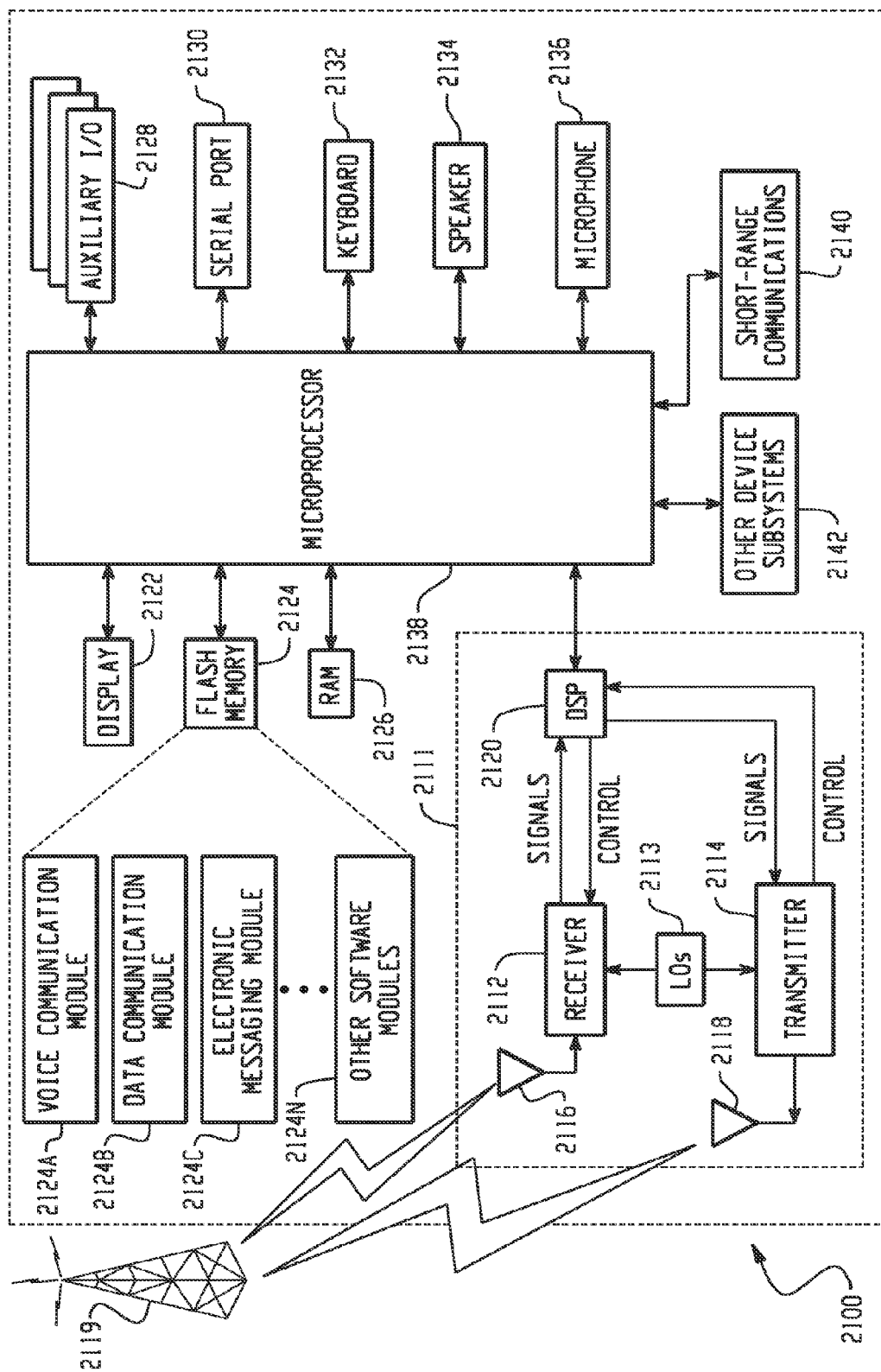
FIG. 21 is a more detailed block diagram of the mobile device of FIG. 1.

FIG. 21 is a block diagram illustrating an example mobile communication device 2100. The block diagram for the example mobile communication device 2100 can be considered a more detailed block diagram of the mobile device 100 of FIG. 1. The mobile device 2100 includes a processing subsystem 2138, a communications subsystem 2111, a short-range communications subsystem 2140, a memory subsystem 2124, 2126, and various other device subsystems and/or software modules 2142. The mobile device 2100 also includes a user interface, which may include a display 2122, a serial port 2130, keyboard 2132, a speaker 2134, a microphone 2136, one or more auxiliary input/output devices 2128, and/or other user interface devices.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

The apparatus, methods, and flow diagrams and structure block diagrams described in this patent document may be implemented in the mobile devices described herein by mobile device program code comprising program instructions that are executable by the mobile device processing subsystem. Other implementations may also be used, however, such as firmware or even appropriately designed hardware configured to carry out the methods and flow diagrams described in this patent document. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof. Furthermore, the apparatus and methods described in this patent document may be implemented in other computing devices, such as a laptop computer, or even a desktop computer. The other computing devices may be operable to communicate with one or more contact databases via a wireless network, a wired network, or a combination of both wireless and wired networks.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

The invention claimed is:

1. A method performed by a communication device, the method comprising:
   receiving a search string being entered in an communication application;
   issuing, over a communication network, a query for contact data corresponding to the search string;
   while awaiting receipt of the data, receiving a selection to exit the application;
   exiting the application before receiving the data;
   receiving, over the communication network, the data; and
   displaying a notification indicative of receipt of the data.

2. The method of claim 1 further comprising, after the receiving of the data:
   displaying a notification of whether to open the application;
   receiving a selection to open the application; and
   opening the application.

3. The method of claim 2 further comprising, after the opening:
   displaying the received data in the application;
   receiving a selection of at least one item from among items included in the data; and
   applying the selected item to the application.

4. The method of claim 3 further comprising, after the applying:
   storing the received data in memory; and
   displaying the stored data the next time the same search string is received.

5. The method of claim 4 wherein the next time the same search string is received occurs in an application that is other than the application in which the search string was received.

6. The method of claim 1 wherein the receiving of the search string is initiated from within a field of a message being composed using the application.

7. The method of claim 6 wherein the field is an address field of the application.

8. The method of claim 7 wherein the address field is defined as a TO field which specifies to whom a currently composed message is addressed.

9. The method of claim 1 further comprising, between the issuing and the receiving of the selection:
   displaying the search string in a field from which the search string was entered, along with an indication that the data is being searched.

10. The method of claim 1 wherein the receiving the selection to exit the application includes receiving a selection to open another application and the exiting includes opening the other application.

11. A communication device comprising:
    a memory configured to store a communication application;

a processor configured to execute the communication application;

input device configured to receive a search string being entered in the application;

a contact query module configured to formulate a query for contact data corresponding to the search string; and a transceiver configured to transmit the query over a communication network and to receive the data from the communication network;

the processor and the input device being further configured to:
- receive, while awaiting receipt of the data, a selection to exit the application;
- exit the application before receiving the data; and
- after receipt of the data, display a notification indicative of receipt of the data.

12. The communication device of claim 11 wherein the processor is further configured to, after receiving the data:
- display a notification of whether to open the application;
- receive a selection to open the application; and
- open the application.

13. The communication device of claim 12 wherein the processor is further configured to, after the opening:
- display the received data in the application;
- receive a selection of at least one item from among items included in the data; and
- apply the selected item to the application.

14. The communication device of claim 13 wherein the processor is further configured to, after the applying:
- store the received data in memory; and
- display the stored data the next time the same search string is received.

15. The communication device of claim 11 wherein the communication device is a mobile communication device.

16. A non-transitory processor readable memory that stores program code that is executable by a processor to:
- receive a search string being entered in a communication application;
- issue, over a communication network, a query for contact data corresponding to the search string;
- while awaiting receipt of the data, receive a selection to exit the application;
- exit the application before receiving the data;
- receive, over the communication network, the data; and
- display a notification indicative of receipt of the data.

17. The processor readable memory of claim 16 wherein the processor readable memory and the processor are of a mobile communication device.

18. The processor readable memory of claim 16 wherein the program code is executable by the processor further to, after receiving the data:
- display a notification of whether to open the application;
- receive a selection to open the application; and
- open the application.

19. The processor readable memory of claim 18 wherein the program code is executable by the processor further to, after opening the application:
- display the received data in the application;
- receive a selection of at least one item from among items included in the data; and
- apply the selected item to the application.

* * * * *